March 4, 1941.  G. R. RADLEY  2,233,849
HEATING SYSTEM
Filed Sept. 24, 1937
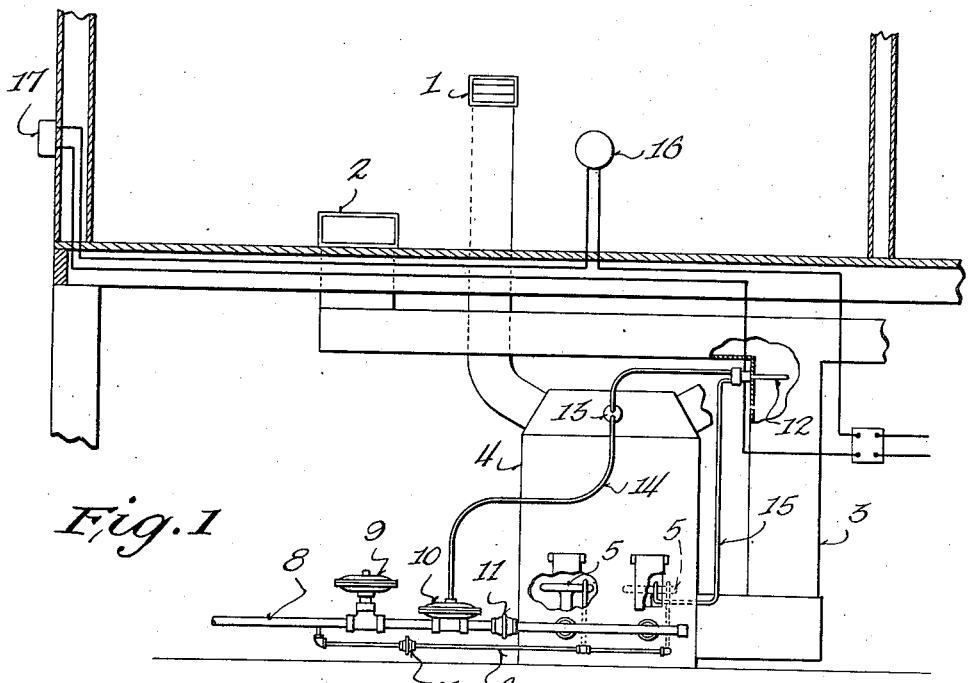
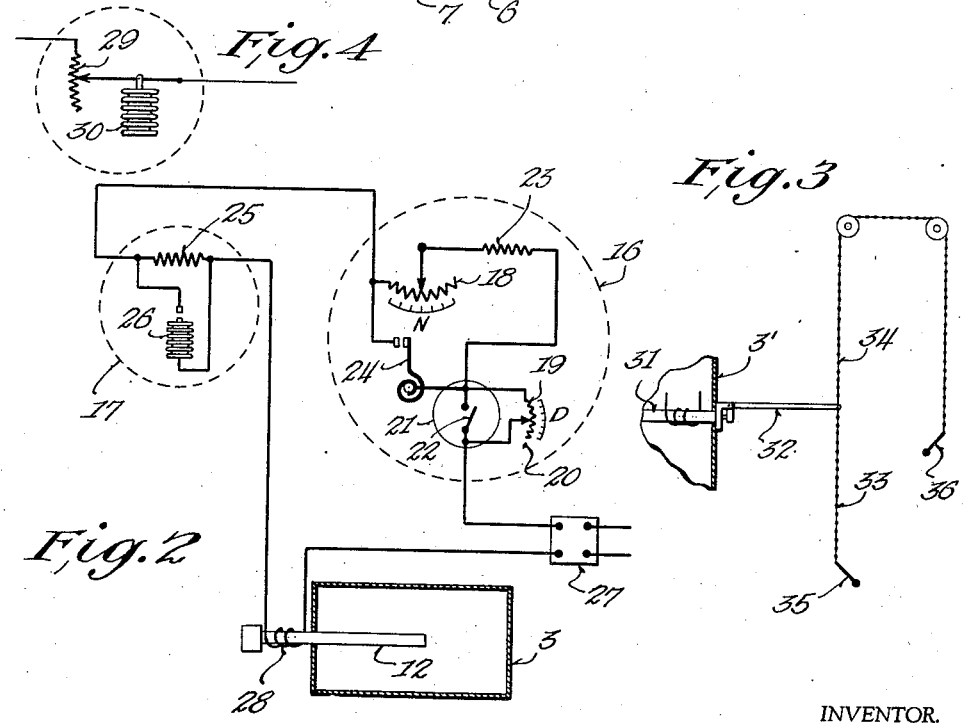
INVENTOR.
GUY R. RADLEY
BY
Arthur R. Woolfolk
ATTORNEY.

Patented Mar. 4, 1941

2,233,849

UNITED STATES PATENT OFFICE 2,233,849

HEATING SYSTEM

Guy R. Radley, Milwaukee, Wis., assignor, by direct and mesne assignments, of one-half to Frank A. Gauger and one-half to Edwin A. Jones, both of Milwaukee, Wis.

Application September 24, 1937, Serial No. 165,457

5 Claims. (Cl. 236—10)

This invention relates to a heating system and is particularly directed to a control for such system.

Objects of this invention are to provide a novel form of heating system in which the main control is located in a return duct for the air or other fluid, in which a substantially instantaneous response to any variation in the temperature of the returning air is secured, in which overshooting of the furnace is avoided, in which the safe temperature of the furnace is never exceeded, in which the flame in the furnace is proportioned to the demand in an immediate and substantially exact manner, in which compensation for variation in outside temperature is provided, and in which the system is so arranged that when a door or window is opened or when a register in any room is opened or closed, a substantially instantaneous adjustment is made prior to altering the average temperature of the entire air in the building.

Further objects are to provide a remote control which although operated from a room in the building, nevertheless controls the main control member and in effect alters its adjustment so that the temperature of the returning air at which it works may be either raised or lowered before a response from this control member is obtained.

Further objects are to provide a remote control which has a day adjustment and a night adjustment, which has a clock that automatically throws in the day or night adjusting means, and which has a thermostat which will alter the effective adjustment of the main control member.

It is well known that in spite of all of the adjustments that may be made interiorly of a building in an attempt to approach satisfactory automatic temperature control, that nevertheless variations in the outside temperature materially alter the effectiveness of the automatic control system.

This invention is designed to provide, in addition to the features hereinabove enumerated, a further remote control for the main control member so that automatic adjustment is made for variations in the outside temperature. For example, if the outside temperature should rise, this change is automatically compensated for by lowering the required temperature at which the automatic control member will respond and, on the other hand, if the temperature should drop outside of the building, the effect of the main control member is automatically altered so that it will respond only to higher temperatures of air in the return duct, thereby providing an automatic compensation for variations in the outside temperature.

In greater detail, this invention contemplates a novel form of remote control which operates by adding an amount of heat to a thermostatic control member, such amount of heat being additional to that picked up by the control member from the air or other heating medium acting on the control member, the automatic control being adjustable to increase or decrease this added amount of heat to thereby alter the point at which the thermostatic control member will respond, the invention contemplating a highly flexible system of remote control so that the amount of added heat may be increased or decreased either manually or automatically and so that compensation for variation in the outside temperature may be additionally obtained.

Embodiments of the invention are shown in the accompanying drawing, in which:

Figure 1 is a diagrammatic view showing a fragment of a house with the burner and control system installed, parts being broken away and in section.

Figure 2 is a wiring diagram of the remote control system.

Figure 3 is a fragmentary view of a further form of the invention.

Figure 4 is a fragmentary view of a modified form of an external control unit adapted to be located externally of the building.

Referring to Figure 1, it will be seen that a fragment of a building has been indicated and that although one room only has been shown, it is intended that as many rooms as desired may be furnished from the furnace. One of the hot air outlets is indicated by the reference character 1 and one of the cold air returns by the reference character 2. The main cold air return is indicated at 3 and the furnace is indicated at 4. This furnace is provided with a combustion chamber in which are located preferably a plurality of burners indicated at 5, each being provided with an individual pilot light furnished by the by-pass pilot line 6 and controlled by the valve 7, the main gas line being indicated by the reference characer 8. A pressure reducing valve 9 and an automatically controlled valve 10 and a manually operable cut-off valve 11 are provided in the main gas line to the burners.

The automatically controlled valve 10 may be either a modulating valve or an on and off valve and is preferably of the diaphragm control type, or, in other words, a fluid relay means controlling the main valve, though any other suitable motor means could be employed without departing from the spirit of this invention. If the valve is an on and off type, it cuts on and off fully in a well known manner and has no intermediate position. On the other hand, if a throttling or floating type of valve is employed, the valve automatically adjusts itself to the requirements, the invention in its broadest aspect being applicable to either type of valve.

A main thermostatic control member 12 is positioned in the main return duct 3 and a limit control or bonnet control 13 is positioned in the bonnet of the furnace and the automatic valve 10 is connected by means of the bleed line 14 with the limit control 13 and with the main control member 12, such limit control and main control members being in series, and an exhaust pipe 15 extends from the main control member 12 to the combustion chamber of the furnace, the valve 10 being a gas controlled automatic valve either of the on and off type or of the modulating type.

The main control member 12 is the ordinary type of throttling thermostat which throttles the amount of gas or other fluid that may be passed therethrough as the temperature of the thermostat rises.

The valve 10 is controlled by the escape of gas from the bleed line 14. As the gas escapes from this bleed line, the valve 10 opens. When no gas escapes from the bleed line 14, the valve closes. The bleed line 14 passes through the thermostat 13 which is a limit thermostat located in the bonnet of the furnace and through the thermostat 12, to the exhaust pipe 15. If either of the thermostats 12 or 13 close the bleed line, the valve 10 will close. The thermostat 13 operates as a limit control so that if the furnace gets too hot irrespective of the operation of any other portion of the apparatus, the thermostat 13 will close the bleed line 14 and cause the valve 10 to close. Ordinarily the thermostat 13 does not take charge of the valve 10 unless the furnace temperature is too high. Instead the thermostat 12 normally has direct control of the valve 10 as the thermostat 13 normally remains open.

A remote control unit is indicated by the reference character 16 and is located at any suitable place in the building, preferably in the main room. An auxiliary remote control unit 17 is located externally of the building and is responsive to outside temperature. This unit preferably includes a polished casing so as to reflect radiant energy, such as sunshine or radiant heat, but is responsive to the temperature of the external air.

Referring to Figure 2, it will be seen that the remote control member 16 consists of a manually adjustable rheostat 18 adapted for night temperature setting and a manually adjustable rheostat 19 adapted for day temperature setting.

These rheostats may each have an off point though it is only necessary to have an off point for the day rheostat indicated generally at 19, such open point or off point being represented by the reference character 20. When it is desired to cause a very quick response from the furnace, the rheostat 19 may be turned to the off point 20 so that the heating circuit is open. The entire heat received by the main control means 12 then comes from the returning cold air in the duct 3 and a very quick response is obtained.

These rheostats may be enclosed in a suitable casing or may be mounted in any other manner and are preferably provided with graduations, as indicated in Figure 2, so that the temperature setting may be marked thereon. A clock 21 is provided with a switch 22 which shorts out the day rheostat during the night period and again opens in the morning and places the day rheostat in series with the night rheostat, as shown. If desired an extra resistance element 23, which may be a fixed resistor, may be provided in series with the rheostats 18 and 19. Additionally, a thermostat indicated generally at 24 is bridged around certain of the resistance members. For instance, as shown in Figure 2, it is bridged around the elements 23 and 18, though it may be obviously bridged around the elements 18, 23 and 19 if so desired, the idea being that when the thermostatic member closes due to an increase of temperature above a predetermined point, that it will short out the resistance and provide for an increase in current flow in the circuit controlled thereby.

The externally located control member is provided with a resistor 25 which is shorted out by a thermostatically responsive member, for instance of the Sylphon bellows type as indicated at 26. The Sylphon bellows expands when the temperature rises to a predetermined point and shorts out the resistance 25, thus increasing the current flow in the circuit controlled by these various resistance elements. Current for this circuit is furnished by a simple step down transformer 27 and the circuit includes a heating element, for instance the heating coil 28, in thermal relation to the main control member 12. The circuit is a low voltage circuit and very little energy is required for such control circuit. In an actual embodiment of the invention only a few watts are required. It is obvious that the heating element 28 may be located either interiorly or exteriorly of the return duct 3, it having been shown as exteriorly located in Figure 2 and interiorly located in Figure 3, such latter figure being hereinafter described.

The operation of the apparatus is as follows: If it is desired to raise the temperature setting or effective point at which the main thermostatic member 12 will respond, it is obvious that the additional amount of heat supplied by the heating element 28 must be decreased. This is readily accomplished by manually adjusting the rheostat 19 for instance, thereby determining the particular temperature at which the system will respond for the day setting.

Obviously the increased resistance of the rheostat 19 lessens the amount of current flowing in the heating element 28 and consequently decreases the amount of additional heat furnished the control member 12. The control member, therefore, will adjust the valve 10 so that the furnace supplies an increased amount of heat until there is again a suitable balance established at which the thermostat 12 responds, the thermostat 12 responding to the sum of the two amounts of heat, namely, that due to the heat in the return duct 3 and that due to the heat furnished by the heating element 28.

On the other hand, if less heat is required, the rheostat 19 may have its resistance decreased, thus increasing the amount of heat additionally supplied the thermostat 12 by the heating element 28. The temperature in the duct 3 can fall therefore and a lower temperature will be required and less heat will be furnished by the furnace.

Obviously the night setting is obtained in exactly the same manner by adjusting the rheostat 18.

When the clock 21 shorts out the day rheostat 19, there is less resistance in this control circuit and consequently more additional heat is furnished the thermostat 12 by the heating element 28 and a lower temperature in the house then obtains.

The purpose of the thermostat 24, which closes with an increasing temperature and opens with a decreasing temperature, is to short out a material portion of the resistance in the control circuit, thus materially increasing the amount of additional heat furnished the thermostatic member 12, thereby insuring a relatively quick response to thus prevent any chance of overheating and to minimize the amount of overshooting of the furnace. It is clear that when a material amount of the resistance is cut out of the control circuit, that a quick response is obtained.

The outside control unit 17 cuts out the resistance 25 if the external temperature rises beyond a predetermined point for which the unit is set. This decreases the resistance in the control circuit and consequently causes an increase in the amount of heat added to the thermostat 12 and thus lessens the amount of heat furnished by the furnace. It is clear, therefore, that an additional automatic remote control is provided which functions in accordance with variations in the external temperature.

It is preferable to mount the control unit 16 at a height approximating that of the head of an individual when standing so as to secure a response of the thermostat 24 if the temperature should rise above a predetermined point at this level prior to any rise in temperature that may occur in the return duct 3, thus materially reducing the amount of overshooting of the furnace.

It is obvious that the resistance 25 does not have to be a fixed resistance. For example, a rheostat 29, as shown in Fig. 4, may be provided and the movable arm thereof may be operated from the Sylphon bellows 30 corresponding to the member 26 previously described. In this manner the amount of resistance is decreased proportionately to the increase in the external temperature instead of cutting out and in a fixed amount of resistance. When the temperature rises, the amount of resistance is decreased automatically by the motion of the thermostatic member or Sylphon bellows member 30.

It is obvious that other forms of control could be used from that shown. The form chosen for illustration is a preferred form but is not intended in any way as limiting the scope of the invention. For this purpose one additional form has been illustrated in Figure 3, though obviously other forms of control, as stated, could be employed. In this form of the invention the main control member 31, which is mounted in the cold air return duct 3', may, through a multiplying lever arrangement, operate the control shifting lever 32. This lever may be connected by chains 33 and 34 with the damper 35 in the smoke pipe and with the air inlet 36 for the combustion chamber of the furnace. This type of control would be suitable for a coal-fired furnace. Obviously if other forms of fuel were used, other types of furnace control members would be employed in place of the valve 10 provided the furnace control was from the main thermostatic control member 12 which was remotely controlled as hereinabove described.

It is to be understood that in the form of the invention shown in Figure 1, that the control members 12 and 13 are in reality gas thermostats and control the bleed line 14 from the valve 10 to thus control the operation of this automatic valve.

It will be seen that although the main control is located in the cold air return duct, that nevertheless remote control is provided and that the remote control is such that it may be set for any degree of night or day temperature and that a limit thermostat is provided with this remote control unit and clock for night and day operation. Also it will be seen that automatic remote control has been provided which proportions the system to the external temperature.

It is to be noted further that the entire device is very simple and practical and may be easily installed without requiring any elaborate precautions to be taken as the system is primarily a low voltage system. The parts composing the control system are relatively simple and inexpensive.

Although this invention has been described in considerable detail, it is to be understood that such description is intended as illustrative rather than limiting, as the invention may be variously embodied and is to be interpreted as claimed.

I claim:

1. In a hot air system, a furnace having a cold air return and a hot air outlet, a fuel burner for said furnace, a valve controlling said burner, thermally responsive main control means located in the cold air return for controlling said valve in accordance with the temperature of the cold air return to said furnace, a heating element for adding additional heat to said main control means to shift the point of calibration of said main control means, a source of electric energy for supplying said heating element, a pair of rheostats for controlling the amount of electrical energy supplied said heating element, and clock means for cutting out one of said rheostats.

2. In a heating system, a furnace for heating a circulating medium, such furnace having an outlet pipe and a return pipe, a throttling thermostatically responsive main control means located in said return pipe, a burner, fluid relay means for operating the control valve and for said furnace, a control valve for said burner having a bleeder line leading to and controlled by said throttling thermostatically responsive main control means, an electrical heating unit for adding heat to said main control means, a source of electrical energy for supplying said heating unit, and a manually adjustable rheostat located at a point remote from said main control means for controlling the amount of electrical energy supplied to said heating unit.

3. In a heating system, heating means including a gas burner, a thermostatically responsive modulating control means, a modulating control valve for said burner, fluid relay means for operating the modulating control valve and having a bleeder line leading to and controlled by said thermostatically responsive modulating control means, an electrical heating unit for adding heat to said modulating control means, a source of electrical energy for supplying said heating unit, and temperature responsive means for controlling the supply of electrical energy to said heating unit.

4. In a heating system, a furnace for heating a circulating medium, said furnace having a burner and having an outlet and an inlet for said medium, a temperature responsive modulating control means acted upon by said medium, a control valve for said burner for controlling the flow of fuel to said burner, fluid relay means for operating said control valve, means operatively connecting said temperature responsive modulating control means with said fluid relay means for controlling the pressure acting on said fluid relay means by said temperature responsive modulating control means, an electrical heating unit for adding heat to said temperature responsive modulating control means to change the point at which it will respond to the ambient temperature, a source of electrical energy for supplying said electrical heating unit, and temperature responsive means for controlling the supply of electrical energy to said electrical heating unit.

5. In a heating system, a furnace for heating a circulating medium, said furnace having a burner and having an outlet and an inlet for said medium, a temperature responsive modulating control means acted upon by said medium, a control valve for said burner for controlling the flow of fuel to said burner, fluid relay means for operating said control valve, means operatively connecting said temperature responsive modulating control means with said fluid relay means for controlling the pressure acting on said fluid relay means by said temperature responsive modulating control means, an electrical heating unit for adding heat to said temperature responsive modulating control means to change the point at which it will respond to the ambient temperature, a source of electrical energy for supplying said electrical heating unit, temperature responsive means for controlling the supply of electrical energy to said electrical heating unit, and manually adjustable means for adjusting the amount of heat supplied said heating unit.

GUY R. RADLEY.